UNITED STATES PATENT OFFICE.

MAX ALBERT KUNZ, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 876,810.  Specification of Letters Patent.  Patented Jan. 14, 1908.

Application filed November 21, 1906. Serial No. 344,489.

*To all whom it may concern:*

Be it known that I, MAX ALBERT KUNZ, doctor of philosophy and chemist, citizen of the Swiss Republic, residing at Mannheim, Germany, have invented new and useful Improvements in Anthracene Dyes and Processes of Making the Same, of which the following is a specification.

In the specification of the application for Letters Patent Serial No. 299,775 is described and claimed the production of coloring matters of the anthracene series from 2.2'-dimethyl-1.1'-dianthraquinonyl, or a homologue, or a derivative thereof, by heating such compound either alone or in the presence of a condensing agent, and it is stated in the said specification that the said coloring matters dye cotton, from the vat, yielding orange shades.

I have now discovered that by treating the aforesaid coloring matters with a halogenizing agent, such for instance as halogen itself, or a substance evolving halogen, new coloring matters can be obtained which dye cotton, from the vat, redder shades than those obtained from the original coloring matters. The new coloring matters themselves, in the condition of powder possess, generally, properties similar to those of the coloring matters from which they are produced, their shades, however, are different. They consist of from yellow to brown powders which are insoluble in water and in dilute acids and in dilute alkalies and are soluble in concentrated sulfuric acid and in hot nitrobenzene and in hot anilin and which are also soluble in alkaline hydrosulfite yielding cherry red vats which produce on cotton blue-red shades which shades on washing are converted into bright orange-red.

The following examples will serve to illustrate further the nature of my invention and explain how it can be carried into practical effect, but my invention is not confined to these examples. The parts are by weight.

Example 1. Well mix ten (10) parts of the product obtainable by heating 2.2'-dimethyl-1.1'-dianthraquinonyl with alcoholic potash as described in Example 1 of the aforesaid specification with one hundred (100) parts of nitrobenzene and, while at ordinary temperature, add seven (7) parts of sulfuryl chlorid ($SO_2Cl_2$). Stir for three (3) hours at a temperature of from sixty (60), to seventy (70), degrees centigrade and, when cold, add one hundred (100) parts of alcohol. Filter, and wash first with alcohol and then with water. The chlorinated product can be re-crystallized from nitrobenzene and obtained in the form of brown-red needles which are insoluble in water and in alkalies and are soluble in concentrated sulfuric acid, yielding a deep blue solution, and in oleum of twenty-three (23) per cent. yielding a dull blue solution. They are difficultly soluble in glacial acetic acid yielding a yellow solution.

Example 2. Well mix ten (10) parts of the coloring matter obtainable by heating 2.2'-dimethyl-1.1'-dianthraquinonyl with alcoholic potash as described in Example 1 of the aforesaid specification, with one hundred (100) parts of nitrobenzene and, while stirring at ordinary temperature, pass a current of chlorin slowly into the mixture for from thirty (30), to forty-five (45), minutes. The brown-yellow color of the liquid turns to orange-red. Dilute with one hundred (100) parts of alcohol, filter and wash with alcohol and, if necessary, with water.

Now what I claim is:

1. The process for the production of anthracene coloring matter by heating a 2.2'-dimethyl-1.1'-dianthraquinonyl body and treating the resulting compound with a halogenizing agent.

2. The process for the production of anthracene coloring matter by heating a 2.2'-dimethyl-1.1'-dianthraquinonyl body with a condensing agent and treating the resulting compound with a halogenizing agent.

3. The process for the production of anthracene coloring matter by heating 2.2'-dimethyl-1.1'-dianthraquinonyl body with alcoholic potash and treating the resulting compound with a halogenizing agent.

4. The process for the production of anthracene coloring matter by heating 2.2'-dimethyl-1.1'-dianthraquinonyl with alcoholic potash and treating the resulting compound with a halogenizing agent.

5. The process for the production of anthracene coloring matter by heating a 2.2'-dimethyl-1.1'-dianthraquinonyl body and treating the resulting compound with sulfuryl chlorid.

6. The process for the production of anthracene coloring matter by heating a 2.2'- dimethyl-1.1'-dianthraquinonyl body with a condensing agent and treating the resulting compound with sulfuryl chlorid.

7. The process for the production of anthracene coloring matter by heating a 2.2'-dimethyl-1.1'-dianthraquinonyl body with alcoholic potash and treating the resulting compound with sulfuryl chlorid.

8. The process for the production of anthracene coloring matter by heating a 2.2'-dimethyl-1.1'-dianthraquinonyl with alcoholic potash and treating the resulting compound with sulfuryl chlorid.

9. As new articles of manufacture the new anthracene coloring matters which can be obtained by treating with a halogenizing agent a coloring matter which can be obtained as aforesaid from a 2.2'-dimethyl-1.1'-dianthraquinonyl body, which new coloring matters consist of from yellow to brown powders which are insoluble in water and in dilute acids and in dilute alkalies and are soluble in concentrated sulfuric acid and in hot nitrobenzene and in hot anilin and which are also soluble in alkaline hydrosulfite yielding cherry red vats which produce on cotton blue-red shades which shades on washing are converted into bright orange-red.

10. As a new article of manufacture the new anthracene coloring matter which can be obtained by treating with sulfuryl chlorid the coloring matter which can be obtained by heating 2.2'-dimethyl-1.1'-dianthraquinonyl with alcoholic potash, which new coloring matter is a brown powder insoluble in water and in dilute acids and in dilute alkalies and soluble in concentrated sulfuric acid and in hot nitrobenzene and in hot anilin and is also soluble in alkaline hydrosulfite yielding a cherry red vat which produces on cotton blue-red shades which shades on washing are converted into bright orange-red.

In testimony whereof I have hereunto set my hand in the presence of two subscribing witnesses.

MAX ALBERT KUNZ.

Witnesses:
  H. W. HARRIS,
  ERNEST F. EHRHARDT.